April 17, 1956

F. V. HUNT ET AL 2,742,566

DEMODULATOR DEVICE

Filed Oct. 9, 1951

INVENTORS
FREDERICK V. HUNT
NORMAN B. SAUNDERS
ROBERT E. KIRKLAND

BY
*[signatures]*
ATTORNEYS

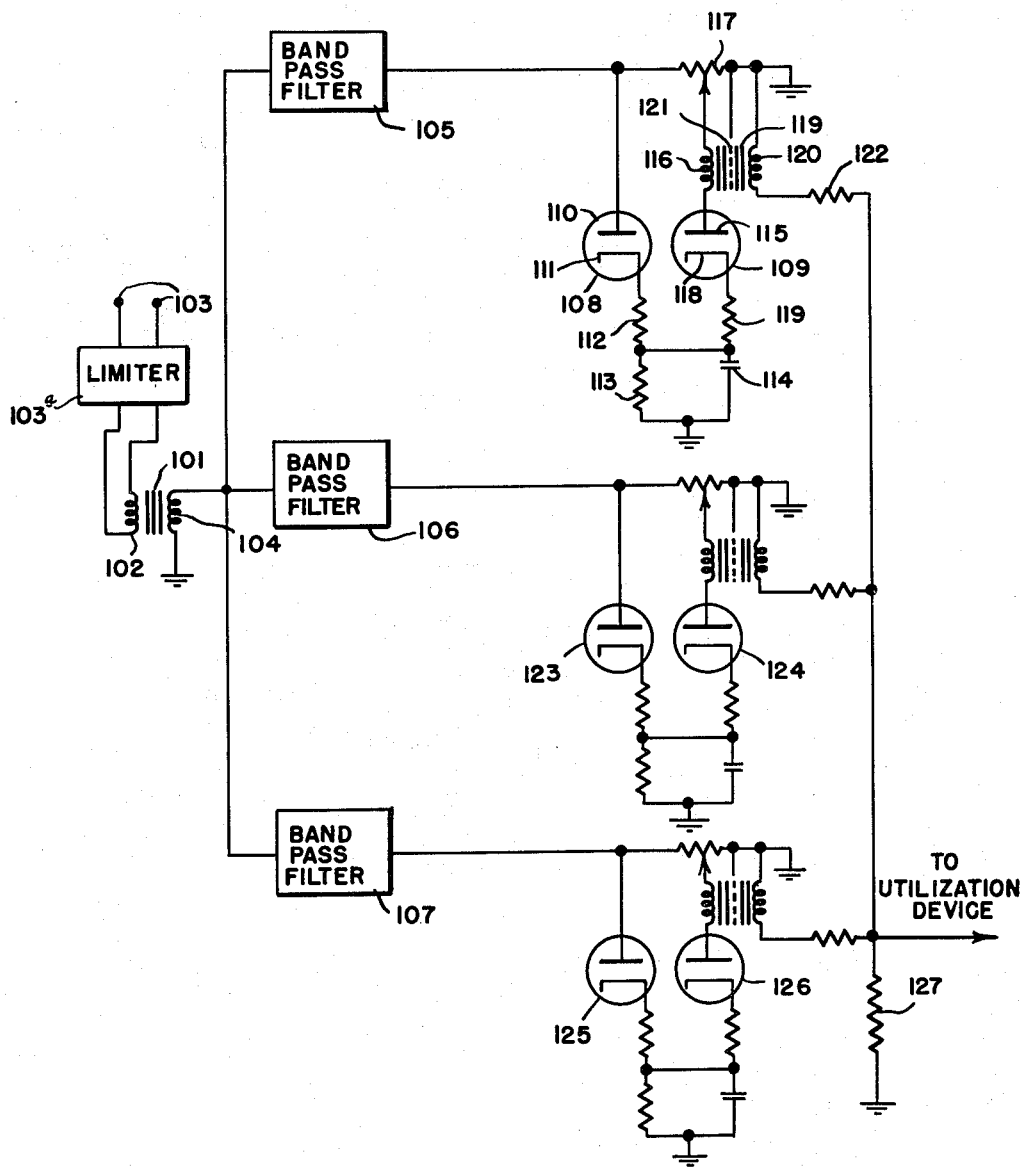

United States Patent Office 2,742,566
Patented Apr. 17, 1956

2,742,566

DEMODULATOR DEVICE

Frederick V. Hunt, Belmont, Norman B. Saunders, Weston, and Robert E. Kirkland, Dorchester, Mass., assignors to the United States of America as represented by the Secretary of the Navy Application October 9, 1951, Serial No. 250,534

2 Claims. (Cl. 250—20)

This invention broadly relates to signal responsive devices in general, particularly relates to signal demodulator devices operative to improve the signal to noise ratio in received signals which may be accompanied by considerable undesired noise components, and specifically relates to improved sonar systems.

In practically all signal reception systems intended to receive low level signals and amplify them for subsequent utilization, the minimum usable input signal level is ultimately limited by the amount of noise received with the signal itself or generated within the first stages of the reception system. Much of such noise is of random frequency distribution. However, under certain circumstances the noise present may be more or less concentrated at certain frequencies or in certain bands of frequencies.

In some instances, signals which themselves are of a narrow band nature and which may be handled by narrow band circuits may occur anywhere over a relatively wide frequency range in which case the receiver must be capable of receiving signals over this entire range. In many such cases, although the signal may override the noise in its immediate vicinity, the total noise occurring in the entire wide range may engulf the signal. For such situation, conventional detectors as employed in receiver amplification systems would respond to the entire range and yield detected signals which are barely discernible, if at all, through the noise.

It is accordingly an object of the present invention to provide an improved demodulator for wide band operation with relatively low signal to noise ratios.

It is another object of the present invention to provide apparatus for improving the signal to noise ratio in signal reception systems.

Another object of the present invention is to provide a method of signal demodulation particularly suited for operation under conditions of low signal to noise ratios.

Another object of the present invention is to provide apparatus for improving the signal to noise ratio in signal reception systems operative under conditions of low signal to noise ratio.

The invention finds particular application for sonar use. In sonar applications for detecting the presence of an underwater object or target a sound signal or pulse of a sharply tuned frequency is sent out toward the target and the echo of this signal, as reflected from the target, is received. By suitable orientation the location of the target can be determined. Frequently, the echo-signal may be immersed in background noises of masking intensity making it difficult to identify the echo.

It is known that the discriminating sense of the ear for pulse signals arises from its ability to concentrate its response in a narrow band of frequencies which forms only a small part of the larger range of frequencies in the sound heard by the ear. The ear selects a band which corresponds to that in which the desired signal is most concentrated and audible over the rest of the sound, regardless of the intensity of the sound outside that band. By this process the ear is able to recognize a signal impulse that is immersed in a background noise of masking intensity, so long as the signal dominates in a small band of the background noise. An object of this invention is to provide sonic receiving equipment that operates in a manner similar to the way in which the human ear operates for recognizing some types of signals in the presence of noise which exceeds the signals in average intensity.

Another object of the invention is to provide sonar receiving equipment capable of responding to a short signal of a critical frequency within a much wider band.

It is a broad object of this invention to provide sonic receiving equipment capable of discriminating between a sonic signal impulse and background noises when the signal to noise intensity-ratio is high and also when the background noises have a generally greater intensity than the signal. Obviously such equipment will have a range and effectiveness that are much greater than that of conventional sonic receiving equipment which always requires a comparatively high signal to noise intensity-ratio through the full receivable band for satisfactory operation.

The invention has especial advantages in connection with receiving signals subjected to marked Doppler shifting. Thus, for example, in the detection of an underwater target, the narrow frequency-bandwidth of the transmitted signal and of the received echo-signal will be the same only if the target is not moving relative to the operating point of transmission and reception. Such conditions rarely prevail; instead, the frequency of the echo will be shifted by an amount that is a function of the relative movement of the target and the aforesaid operating point. Since the amount of this relative movement is generally unknown, a receiver for the echo must be tuned relatively broadly in order to pick up the echo whose frequency has been shifted by an unknown amount, although the echo itself possesses a relatively narrow frequency bandwidth. Under such circumstances the receiver receives noises through the broad range of the receiver which might ordinarily mask out the echo; but in accordance with the invention, the signal to noise ratio is improved so as to render the signal discernible or useful.

A further and important object of the invention is to provide sonic equipment capable of converting a signal impulse that is too short to be recognized by the human ear into one that is readily recognized.

Still another object of the invention is to provide sonic receiving equipment capable of recognizing a signal impulse that is too short to be perceived by the human ear and is also immersed in enveloping background noises of greater average intensity.

With these and other objects in view, as will hereinafter more fully appear, and which will be more particularly pointed out in the appended claims, reference is now made to the following description taken in connection with the accompanying drawings in which:

Fig. 3 is a modification of the basic embodiment of Fig. 1.

In accordance with the basic concept of the present invention an improved demodulator system is provided which possesses numerous advantages particularly under operating conditions where the signal to noise ratio is low, for example, less than unity. Such a demodulator system finds great utility in sonar applications, for example, where the desired signal, even though it possesses a relatively narrow bandwidth, may be shifted by Doppler effect to fall anywhere over a rather wide frequency range. In the present demodulator system, the wide frequency range is divided into a plurality of relatively narrow bands or channels, each of which has a bandwidth which is no more than adequate to contain all or a major part of the spectrum of the desired signals. The output of each channel is demodulated independently and then combined with the outputs of the other channels into a single output circuit. An important feature of this device is that the desired signal thus obtained from any one of the channels is employed to control the sensitivity of demodulation in all channels, reducing the sensitivity in channels where the desired signal is absent or the signal to noise ratio is exceptionally low, thereby to further reduce the overall noise present in the combined output.

Figure 1:
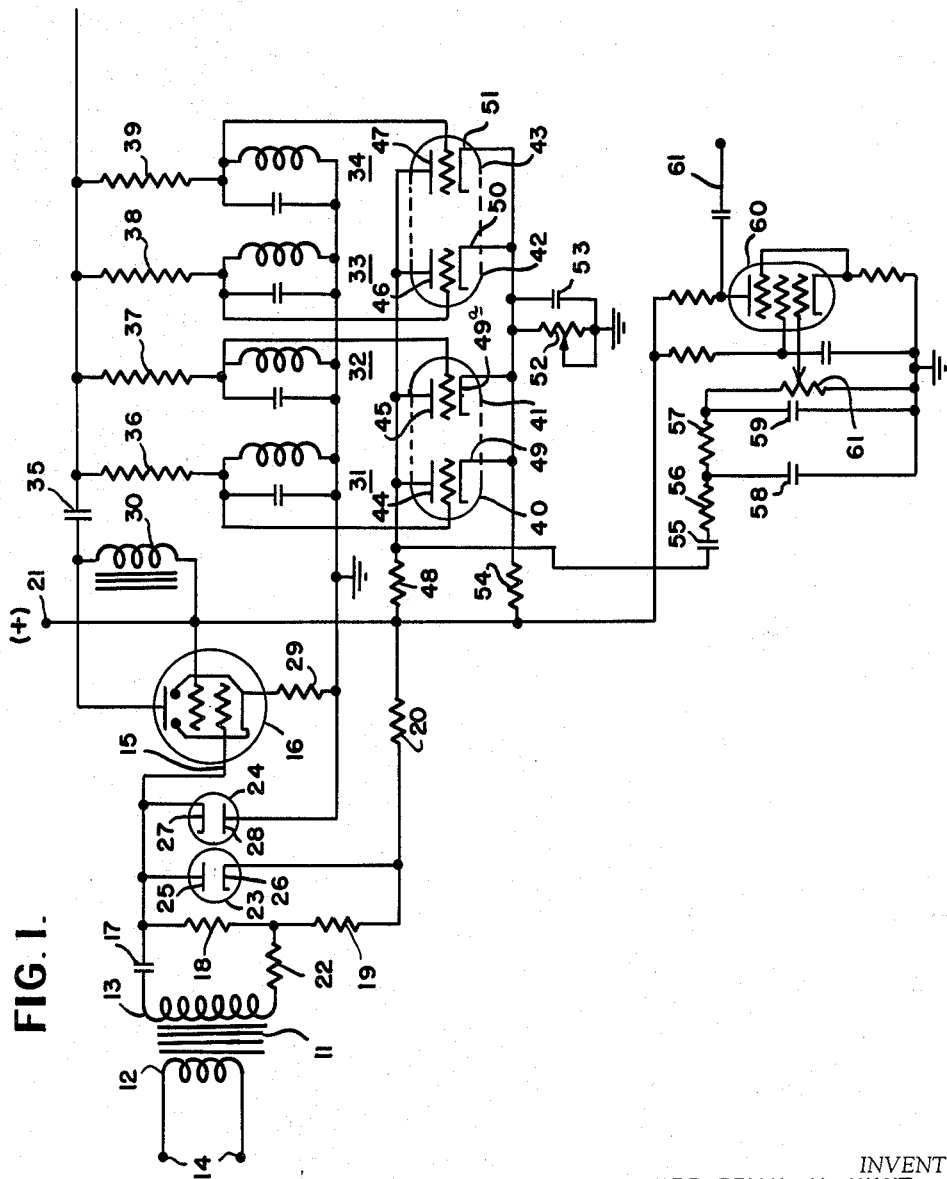
Fig. 1 is a schematic diagram of a basic embodiment of the features of the present invention.

With particular reference to the drawings herein in which like reference characters designate corresponding parts throughout the several views, there is shown in the basic embodiment of Fig. 1 an improved demodulator system constructed in accordance with the teachings of the present invention. This system includes a suitable input coupling circuit, such as the transformer 11, having coupled primary and secondary windings 12 and 13 respectively. Primary 12 is connected to signal input terminals 14 whereas secondary 13 is connected to the grid 15 of an electron tube 16 through the coupling circuit comprising in the main the capacitance 17 and resistance 18. Resistance 18 is further placed in series with resistances 19 and 20, the latter being connected to a suitable source of (B+), 21, whereas the secondary winding 13 is connected to the juncture point of resistances 18 and 19 through the resistance 22. Also connected in the grid circuit of tube 16 is a suitable noise-limiting means such as the opposed biased unilateral impedance devices 23 and 24. The inclusion of such limiting devices is desirable to limit noise pulses and otherwise maintain a greater uniformity in voltage level in the output of tube 16. The unilateral impedance device 23 is placed in the circuit with its anode 25 connected to the grid 15 and its cathode 26 connected to the juncture point of resistances 19 and 20. Unilateral impedance device 24 is placed in the circuit with its cathode 27 connected to the grid 15 and its anode 28 connected to ground.

Tube 16 which is typified as of the beam power variety such as a type 6V6 has its cathode connected to ground through a suitable cathode biasing resistor 29, its screen connected to a suitable positive supply, and its anode connected to a positive supply through an impedance element 30. Normally this impedance element could comprise a choke having an inductance of suitable magnitude for the frequencies involved.

Coupled to the anode of tube 16 is a plurality of frequency selective circuits represented in Fig. 1 by the numerals 31, 32, 33, and 34. It is understood that although only four such circuits are shown in Fig. 1 to avoid undue circuit complexity, actually many more circuits would normally be used. These circuits are all of the parallel resonant variety, individually tuned to selected different frequencies throughout the full range over which signals applied to terminals 14 may occur. Each parallel resonant circuit has a somewhat restricted bandwidth tuned to a fundamental frequency slightly different from that of the circuits tuned closest to it, but the range of all of the circuits together corresponds to that expected to be applied to the terminals 14. Preferably, each circuit has a reasonably high Q, and preferably the inductances are of the same value.

The circuits 31, 32, 33 and 34 are coupled to the anode of tube 16 through the capacitance 35 and suitable isolating resistance elements 36, 37, 38 and 39 which are included to minimize interaction between the resonant circuits.

Each of the parallel resonant circuits is connected to a demodulator here shown as of the infinite impedance type with triode tubes 40, 41, 42 and 43. Signal input is to the grid of each of these tubes, connection being made directly across the appropriate resonant circuits 31, 32, 33 and 34. All anodes 44, 45, 46 and 47 of the tubes are connected together and through resistance 48 to the source 21 of (B+) potential. Similarly, cathodes 49, 49a, 50 and 51 are connected together to a common cathode biasing network. This network as shown in Fig. 1 comprises the variable resistor 52 shunted by the bypass capacitance 53 and a bleeder resistance 54 connected to (B+) 21. Signals developed across the demodulator load resistance 48 are applied through coupling capacitance 55 and a dual section low-pass filter, including resistances 56 and 57 and capacitances 58 and 59, to the grid of an amplifier tube 60; the connection including a potentiometer 61 that provides an effective means for selecting the amount of filtered output signal applied to the amplifier tube. Signals realized at the anode of tube 60 are applied via a suitable output coupling circuit 61 to a utilization device of more or less conventional form.

In the operation of this overall circuit of Fig. 1, tube 16, in the absence of applied signals to terminals 14, must be considered as being operative with substantially zero bias by virtue of the conductive path from (B+) through resistances 20, 19 and 18 to grid 15. Diode action between the grid and cathode of tube 16 thus effectively clamps the grid 15 at a potential slightly higher than cathode potential. Substantially consistent bias potential thus is maintained holding a fixed reference level at the anode of tube 16. When input signals are applied to terminals 14, they appear across secondary 13 and are clipped in both plus and minus polarities between the opposed impedance devices 23 and 24. The signals are then coupled through the tube 16 and capacitor 35 to the frequency selective circuits 31, 32, 33, 34, etc. Thus in accordance with the frequencies of the applied signal, appropriate one or ones of these frequency selective circuits will be excited into damped oscillation.

The frequency selective circuits 31, 32, 33, 34, etc. are stepped or graded in increments through the range of frequencies that are to be received. If it is assumed that a pure tone signal of K cycles per second is being received, and that this frequency occupies but a narrow part of the band covered by the cricuits considered together, then the signal will strongly excite the particular circuits 31, 32, 33 or 34, etc. tuned closest to it, the other circuits being weakly excited, if at all. In a sense, the different tuning of the circuits provides a discriminating or selective effect channeling the signal through a selected tuned or filter circuit. The graded frequency tuning of the circuits 31, 32, 33, 34, etc. to a series of adjacent frequencies in a chosen range provides signal selection or noise rejection on a frequency basis. Also by providing the relatively high Q as above specified, an input signal which may in some instances be of an intermittent nature, is effectively lengthened which in some cases is desirable.

The infinite impedance demodulators or detectors, for example, detectors 40, 41, 42 and 43 are biased near cutoff by adjustment of the resistance 52 so that when broad-band noise of the type normally to be expected in use of the apparatus is on input terminals 14, practically no output is obtained from tube 60. In this connection it is to be realized that such cutoff biasing is possible because of the bleeder resistance 54 connected to (B+) which can thereby maintain the cathodes of tubes 40, 41, 42 and 43 at a positive potential if desired even with these tubes cut off.

When a pure tone signal is present at the input terminals 14 the appropriate one of the resonant circuits, such as 31, 32, 33, and 34, according to frequency, will be excited into relatively large oscillations. When this occurs, the appropriate infinite impedance demodulator will conduct a heavier plate current than before to produce a voltage drop across anode circuit resistance 48 lowering the potential at the anodes of the tubes. Simultaneously the current through resistance 52 increases.

The increased drop across the resistance 48 manifests itself at the output circuit 61 and a utilizable signal is produced responsive to that received. Moreover, the increased drop across resistance 52 provides additional bias on the tubes 40, 41, 42 and 43 to drive them further beyond cut-off and thereby reduce the noise contribution of each demodulator in the combined output applied to the grid of tube 60.

It is thus seen that this basic demodulator circuit provides not only noise limiting on an amplitude basis but also noise-to-signal ratio reduction on a frequency basis wherein signals present at one frequency effectively reduce the overall system response to noise signals at other frequencies.

While the invention is of broader application, its teachings are particularly applicable to sonar use. For such use as many as twenty or more resonant or tuned circuits, such as 31, 32, 33 and 34 may be provided tuned to a series of adjacent frequencies in the audio-spectrum between 600 and 1000 cycles per second, being distributed approximately uniformly on a logarithmic scale, each tuned circuit having an inductance coil of .69 henry. The resistor, such as 36, 37, 38 and 39, associated with each tuned circuit is of a suitable value to so isolate the associated tuned circuit that a voltage is developed across the circuit at resonance that is approximately two-thirds of that required to drive the tube 16 to full output. The sharpness of resonance of the individual tuned circuits produces a considerable improvement in discrimination, especially since the desired sharp signal competes in a single tuned circuit with only about 1/20 of the total noise energy accepted by the complete set of twenty tuned circuits, on the assumption of approximately uniform distribution of the noise. Even with an uneven distribution of noise, the discrimination will be considerably enhanced.

Figure 2:
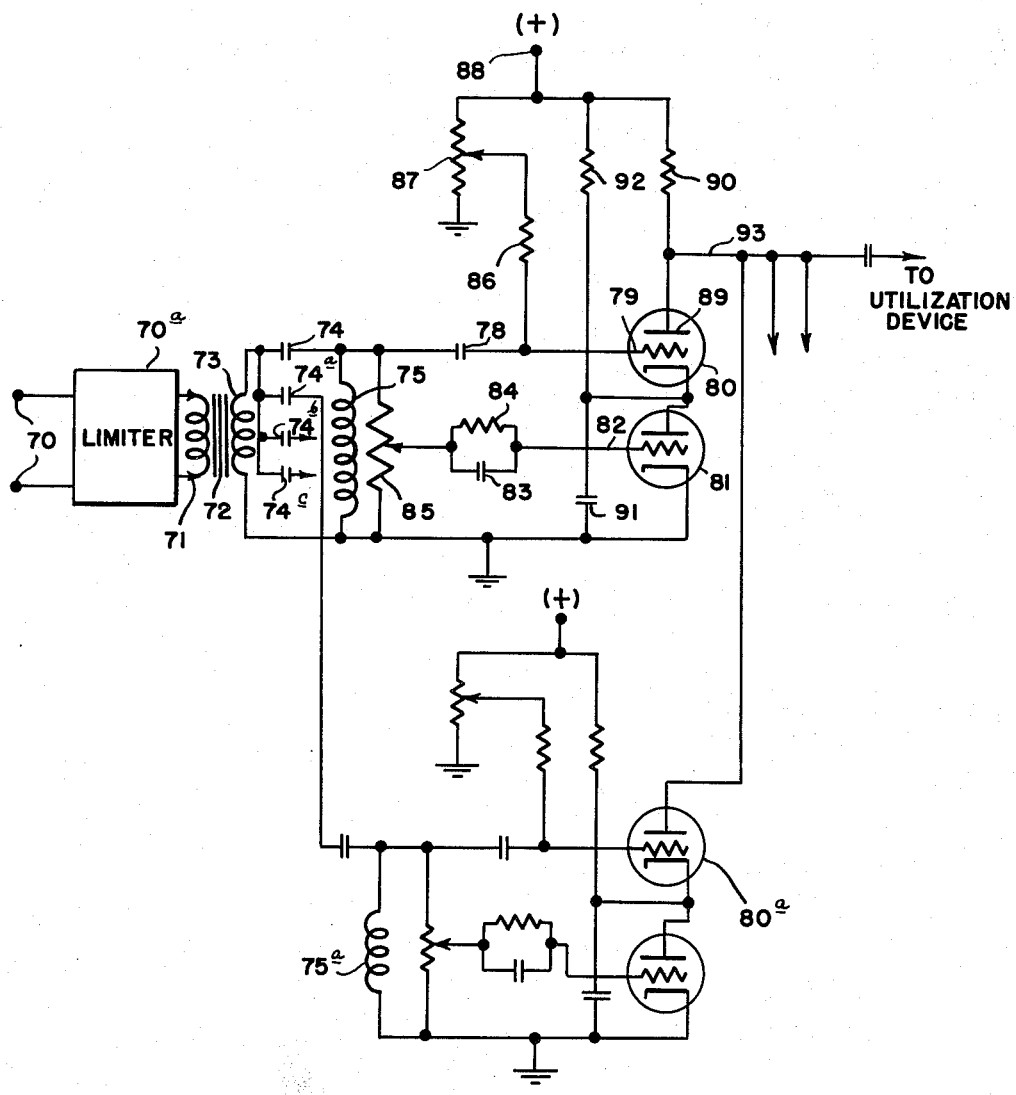
Fig. 2 is a variant embodiment of a component circuit which can be employed in the apparatus of the present invention.

With reference now to Fig. 2, a modification in the basic circuit is shown which under certain circumstances may offer further improvement in noise rejection. The apparatus of this circuit by comparison to Fig. 1 shows only two resonant circuits and demodulators to avoid undue complexity, it being understood that in a complete apparatus there would be required as many more such channels. In this circuit of Fig. 2 input signals are applied to input terminals 70. It is desirable that amplitude limiting be employed as with Fig. 1, to which end a limiter 70-a is included. Terminals 70 are connected through limiter 70-a to the primary winding 71 of transformer 72 which transformer also has a secondary winding 73 providing excitation for series resonant frequency selective circuits comprising, for example, capacitance 74 and inductance 75. Actually the series resonant circuit of capacitance 74 and inductance 75 is equivalent in frequency selection to one of the resonant circuits such as 31 in the previously described Fig. 1. Other series resonant circuits for different frequency coverage would similarly be connected across the secondary winding 73. This is indicated in Fig. 2 by the capacitances 74-a, -b, -c which would be the capacitive components of such resonant circuits and by the additional circuitry following inductance 75-a responsive to a different frequency band.

The juncture point between capacitance 74 and inductance 75 is connected by way of coupling capacitance 78 to the grid 79 of electron tube 80 which as shown is of the triode variety having, in addition to the grid 79, anode and cathode electrodes. A second triode type electron tube 81 has its grid 82 connected by way of the coupling circuit of capacitance 83 and resistance 84 and potentiometer 85 to the juncture point of capacitance 74 and inductance 75.

In the grid circuit of tube 80 is disposed a grid return resistance 86 and a potentiometer 87. Potentiometer 87 is connected between a suitable source of (B+) 88 and ground and by virtue of the variable tap thereof may be employed to control the D. C. potential existent at the grid 79.

The anode 89 of tube 80 is connected to (B+) 88 by way of resistance 90. The cathode of tube 80 is connected to the anode of tube 81, this common connection being by-passed to ground by capacitance 91 and conductively connected to (B+) 88 through resistance 92. In turn the cathode of tube 81 is grounded. The anode 89 of tube 80 is connected, through utilization circuit 93, to some suitable form of utilization device not shown.

In normal circuit operation, electron tube 81 which is possessed normally of near zero bias is conductive to some extent, forming with resistance 92 a voltage divider across (B+) to maintain the cathode of tube 80 at some potential which is lower than (B+) 88. With such a condition potentiometer 87 is adjusted to hold tube 80 at cut-off in the absence of an applied signal at terminals 70. Signals then developed across the inductance 75 as a result of input signals supplied to input terminals 70 raise the grid 79 of tube 80 above cut-off potential to bring tube 80 to conduction and provide output signals which are developed across resistance 90. This action is modified through the operation of tube 81 which also receives at its grid 82 a fraction of the signal developed across inductance 75 as selected by a variable tap on potentiometer 85. These signals when applied through the coupling circuit capacitance 83 and resistance 84 to the normally zero biased tube 81 result in grid circuit conduction in tube 81 to develop a grid leak biasing voltage across capacitance 83 by familiar process. This grid leak bias voltage causes the grid 82 to assume an average potential which is negative with respect to the potential at the cathode of tube 81, thereby effectively increasing the average anode resistance of tube 81 and raising the potential at the cathode of tube 80. This action increases the negative bias on tube 80 so that it is no longer operating at cut-off and hence less responsive to small amplitude noise.

In the complete circuit in accordance with Fig. 2, a plurality of dual triodes such as the electron tubes 80 and 81 would be employed, all having independent biasing elements, all employing the same single anode resistance 90, and all receiving the signals from secondary 73 through individual series resonant circuits. As further exemplification, the anode of tube 80-a is shown connected to the anode of tube 80.

Fig. 3 shows another form of demodulation device which provides an interesting variation of the fundamental features of the present invention. This apparatus employs as before a suitable form of input coupling means such as the transformer 101 to receive input signals across its primary 102 as applied to the input terminals 103. Limiting may be provided if desired by the limiter 103-a inserted between the input terminal 103 and the transformer 101. The secondary 104 of transformer 101 is connected to a plurality of band-pass filters 105, 106, and 107 which, for example, may be of the series of parallel resonant type as shown in the preceding figures or the like. The primary requirements are that they be set individually to the desired typical frequency so as to be graded through the range of frequencies to be received, and have a suitable Q factor. For sonar the range may be from 500 to 1000 cycles and the Q about 30.

The output of each band-pass filter is connected to a demodulation device, the type as herein shown including a pair of unilateral impedance elements typified by components 108 and 109 for the band-pass filter 105. By way of example, impedance element 108 is an electron tube of diode type having an anode electrode 110 and a cathode electrode 111. The anode of tube 110 is connected direct to the output of the band-pass filter 105 whereas the cathode 111 is connected to ground through resistance 112 in series with resistance 113, the latter being by-passed by capacitance 114. The anode 115 of impedance element 109 is likewise connected to the output of band-pass filter 105. However, this connection is made through the primary winding 116 of a coupling transformer and also through the potentiometer 117. The cathode of impedance element 109 is connected to ground through resistance 119 in series with the previously mentioned resistance 113 and capacitance 114.

The primary winding 116 is part of a coupling transformer 119 which additionally includes a secondary winding 120 and an electrostatic shield 121. The secondary winding 120 is connected through isolating resistance 122 to some suitable form of utilization device which is not shown in Fig. 3. Similar connections of the second set of unilateral impedance elements 123 and 124 to the output of band-pass filter 106 and the third set of unilateral impedance elements 125 and 126 to the output of band-pass filter 107 are made, the outputs from all three sets of unilateral impedance elements being combined into a single channel appearing across load resistance 127.

In the operation of this circuit of Fig. 3 when a filter output signal is realized for example from band-pass filter 105, a rectified voltage is developed by unilateral impedance element 108, providing a similar voltage across resistance 113 which also appears at the cathode 118, being applied through the resistance 119. This offset biasing voltage developed in response to signals from band-pass filter 105 produces the same sort of variation in threshold level as was obtained in the devices shown in Figs. 1 and 2. That is, responsive to received signals of desired frequencies the detector threshold level is altered to reduce the sensitivity of the system to noise. The time constant determined by capacitance 114 and resistance 113 is such that the bias variation will follow relatively slow changes but will not respond so rapidly as to eliminate the rectification of short pulse signals by the unilateral impedance element 109. Conduction by unilateral impedance element 109 provides a signal across primary winding 116 which is coupled to the secondary winding 120 to appear in the output for delivery to the utilization device.

From an examination of the circuits presented above it can be seen that signal demodulation performed thereby provides for certain types of signals a measure of noise reduction not available with detection systems previously known.

It should be understood, of course, that the foregoing disclosure relates to only typical embodiments of the invention and that modification or alteration may be made therein without departing from the spirit and the scope of the invention as set forth in the appended claims.

What is claimed is:

1. Demodulator apparatus adapted for detecting a sharply tuned signal with apparatus having wide bandwidth operation comprising, a signal input circuit, limiting means for amplitude limiting input signals applied to said signal input circuit, a plurality of narrow bandwidth series resonant tuned circuits, each being of relatively high Q and responsive to a narrow bandwith portion of the wide band desired, a plurality of demodulators for individually demodulating the signals from the resonant circuits and each comprising a multi-electrode electronic tube having a cathode electrode and a grid connected to the output of one of said tuned circuits for receiving the signals therefrom, each of said demodulators further including a multi-electrode electronic tube in series relationship with the cathode electrode of each of said demodulators responsive to undemodulated input signals from the corresponding one of said plurality of tuned circuits and operative to provide negative bias at cut-off for said first-mentioned electronic tubes in absence of desired signals and in excess of cut-off in presence of desired signals, and means for combining the demodulated signals for all of said demodulators.

2. Demodulator apparatus adapted for detecting a narrow band signal falling somewhere between the limits of a much wider band and in the presence of objectionable noise distributed between the limits of the much wider band, said apparatus comprising: a signal input circuit; limiting means connected in circuit with the input side of said signal input circuit for amplitude limiting input energy applied to said signal input circuit; a plurality of narrow bandwidth series resonant tuned circuits each having a relatively high Q and responsive to sucessive contiguous narrow bands of frequency between the limits of the aforesaid much wider band, each of said plurality of tuned circuits connected across the output side of said signal input circuit and each having a pair of output terminals; a corresponding plurality of demodulators each connected to the output terminals of a corresponding one of said tuned circuits for individually demodulating the signals from the corresponding tuned circuits; each of said demodulators including a first and a second multi-electrode electronic tube each having at least a plate, a control grid, and a cathode, the cathode of said first tube connected to the plate of said second tube; a corresponding plurality of coupling condensers connecting the control grid of each of said first tubes to one of the output terminals of the corresponding one of said tuned circuits, the cathode of each second tube being connected directly to the other terminal of the corresponding tuned circuit; a corresponding plurality of variable voltage dividers separately connected across the output terminals of each of the corresponding tuned circuits; a corresponding plurality of grid-leak biasing means connecting the control grid of each second tube to the output of the corresponding voltage divider; a corresponding plurality of bypass condensers separately connected in shunt across each second tube; a common power supply; a common load connected between said power supply and the plate of each of said first tubes of each of said demodulators for combining demodulated signals of all of said demodulators; each of said demodulators further including a separate adjustable voltage divider connected across said power supply and to the control grid of its first tube for applying a positive potential thereto and a separate load resistor connected between said power supply and the plate of said second tube; whereby in the absence of signal output from the corresponding one of said tuned circuits the resultant bias on the first tube of a demodulator resulting from conduction through the second tube and due to the positive potential on its control grid obtained from the corresponding adjustable voltage divider connected across said power supply is just sufficient to bias the first tube at cutoff and when a signal output is derived from the corresponding tuned circuit the bias on the second tube is driven negatively for making the demodulator less responsive to small amplitude noise accompanying the signal output from the corresponding tuned circuit.

References Cited in the file of this patent

UNITED STATES PATENTS

| 1,968,460 | Llewellyn | July 31, 1934 |
| 2,165,304 | Runge et al. | July 11, 1939 |
| 2,253,450 | Travis | Aug. 19, 1941 |
| 2,269,011 | Dallas | Jan. 6, 1942 |
| 2,282,101 | Tunick | May 5, 1942 |
| 2,303,493 | Purington | Dec. 1, 1942 |
| 2,646,499 | McLaughlin | July 21, 1953 |

FOREIGN PATENTS

| 459,568 | Great Britain | Jan. 11, 1937 |